US010086708B2

(12) United States Patent
Ichida et al.

(10) Patent No.: US 10,086,708 B2
(45) Date of Patent: Oct. 2, 2018

(54) BICYCLE COMPONENT CONTROL APPARATUS

(75) Inventors: Tadashi Ichida, Osaka (JP); Toyoto Shirai, Osaka (JP); Yoshiyuki Kasai, Osaka (JP); Ryuichiro Takamoto, Osaka (JP)

(73) Assignee: Shimano Inc., Osaka (JP)

( * ) Notice: Subject to any disclaimer, the term of this patent is extended or adjusted under 35 U.S.C. 154(b) by 885 days.

(21) Appl. No.: 13/076,994

(22) Filed: Mar. 31, 2011

(65) Prior Publication Data
US 2012/0253601 A1    Oct. 4, 2012

(51) Int. Cl.
| B60L 11/00 | (2006.01) |
| B60G 13/00 | (2006.01) |
| B60G 17/018 | (2006.01) |
| B60G 17/0195 | (2006.01) |
| B62M 25/08 | (2006.01) |
| B60L 11/18 | (2006.01) |
| B62M 25/00 | (2006.01) |

(52) U.S. Cl.
CPC ............ *B60L 11/007* (2013.01); *B60G 13/00* (2013.01); *B60G 17/018* (2013.01); *B60G 17/0195* (2013.01); *B60L 11/1862* (2013.01); *B62M 25/08* (2013.01); *B60G 2300/12* (2013.01); *B60G 2400/90* (2013.01); *B60G 2500/10* (2013.01); *B60G 2500/30* (2013.01); *B60G 2600/20* (2013.01); *B60L 2200/12* (2013.01); *B60L 2240/547* (2013.01); *B60L 2240/549* (2013.01); *B60L 2250/16* (2013.01); *B62M 2025/003* (2013.01); *Y02T 10/7005* (2013.01); *Y02T 10/705* (2013.01); *Y02T 10/7044* (2013.01)

(58) Field of Classification Search
CPC ............ G01R 31/3648; G01R 31/3627; G01R 31/3662; G01R 31/3631; Y02E 60/12
USPC ................................. 280/209, 212, 215, 230
See application file for complete search history.

(56) References Cited

U.S. PATENT DOCUMENTS

| 5,664,636 A * | 9/1997 | Ikuma et al. ............... 180/206.1 |
| 5,667,233 A * | 9/1997 | Metzinger ...................... 280/238 |
| 5,798,702 A * | 8/1998 | Okamoto et al. .......... 340/636.1 |
| 5,878,831 A * | 3/1999 | Saito et al. ................ 180/206.2 |
| 5,971,116 A | 10/1999 | Franklin |
| 6,260,649 B1 * | 7/2001 | Carney, Jr. .................... 180/220 |

(Continued)

FOREIGN PATENT DOCUMENTS

| JP | 1-145215 A | 6/1989 |
| JP | 2003-312570 A | 11/2003 |
| WO | WO 99/59860 A1 | 11/1999 |

*Primary Examiner* — Bao Long T Nguyen
(74) *Attorney, Agent, or Firm* — Global IP Counselors, LLP

(57) ABSTRACT

A bicycle component control apparatus is basically provided with a power supply sensor and a controller. The power supply sensor detects a power level of a power supply being supplied from the power supply to two electrical bicycle components. The controller operates the two electrical bicycle components in response to receiving at least one signal from at least one input member. The controller operates the two electrical bicycle components at different starting times while the power level is below a prescribed power level. The controller is configured to simultaneously operate the two electrical bicycle components while the power level is above the prescribed power level.

17 Claims, 11 Drawing Sheets

(56) References Cited

U.S. PATENT DOCUMENTS

| | | | |
|---|---|---|---|
| 6,646,400 B2 * | 11/2003 | Uno | 318/479 |
| 7,065,434 B2 * | 6/2006 | Uno | 701/36 |
| 7,123,155 B2 * | 10/2006 | Schinner | 340/636.1 |
| 7,165,641 B2 * | 1/2007 | Kitamura | 180/206.2 |
| 7,595,642 B2 * | 9/2009 | Doyle | G01R 31/3693 320/132 |
| 7,798,929 B2 * | 9/2010 | Takamoto et al. | 474/80 |
| 7,874,567 B2 | 1/2011 | Ichida et al. | |
| 8,188,876 B1 * | 5/2012 | Holley et al. | 340/636.15 |
| 8,473,130 B2 * | 6/2013 | Brady et al. | 701/22 |
| 2005/0280244 A1 * | 12/2005 | Watarai | B62J 11/00 280/288.4 |
| 2009/0192673 A1 | 7/2009 | Song et al. | |
| 2010/0327542 A1 * | 12/2010 | Hara | B62J 99/00 280/5.503 |
| 2011/0202236 A1 * | 8/2011 | Galasso et al. | 701/37 |
| 2011/0238250 A1 * | 9/2011 | Takao | 701/22 |
| 2012/0316710 A1 * | 12/2012 | Saida | 701/22 |

\* cited by examiner

BICYCLE COMPONENT CONTROL APPARATUS

BACKGROUND

Field of the Invention

This invention generally relates to a control apparatus that is configured to control a bicycle component. More specifically, the present invention relates to a bicycle component control apparatus for controlling an electrically adjustable component.

Background Information

In recent years, some bicycles are provided with electrically adjustable components. Examples of some these electrically adjustable components include suspensions, derailleurs and a seatpost. Often these electrically adjustable components are provided with an electric unit that includes such parts as a motor or other drive device for adjusting the electrically adjustable component and a position sensor for detecting a position of the electrically adjustable component. Typically, bicycles equipped with electrically adjustable components are also provided with an electrical power supply such as a battery or a generator for supply electrical energy to the electrically adjustable components.

One example of a conventional bicycle electrical system is disclosed in Japanese Laid-Open Patent Publication No. 2003-312750. The conventional bicycle electrical system of this publication has two electric components connected with an electric power communication line. This conventional bicycle electrical system also has a control unit provided on a front derailleur and an operating unit provided on a handlebar. This conventional bicycle electrical system uses an electric power line communication technology to connect the control unit and the operating unit through the electric power line. Other electric components are connected to the control unit with signal lines.

SUMMARY

In view of the state of the known technology, a bicycle component control apparatus is disclosed herein that simultaneously operates at least two electrical bicycle components while a power level of a power supply is above a prescribed power level, and operates the two electrical bicycle components at different starting times while the power level is below the prescribed power level.

In one embodiment, a bicycle component control apparatus is provided that basically comprises a power supply sensor and a controller. The power supply sensor detects a power level of a power supply being supplied from the power supply to two electrical bicycle components. The controller is configured to operate the two electrical bicycle components in response to receiving at least one signal from at least one input member. The controller is configured to operate the two electrical bicycle components at different starting times while the power level is below a prescribed power level. The controller is configured to simultaneously operate the two electrical bicycle components while the power level is above the prescribed power level.

These and other objects, features, aspects and advantages of the bicycle component control apparatus will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
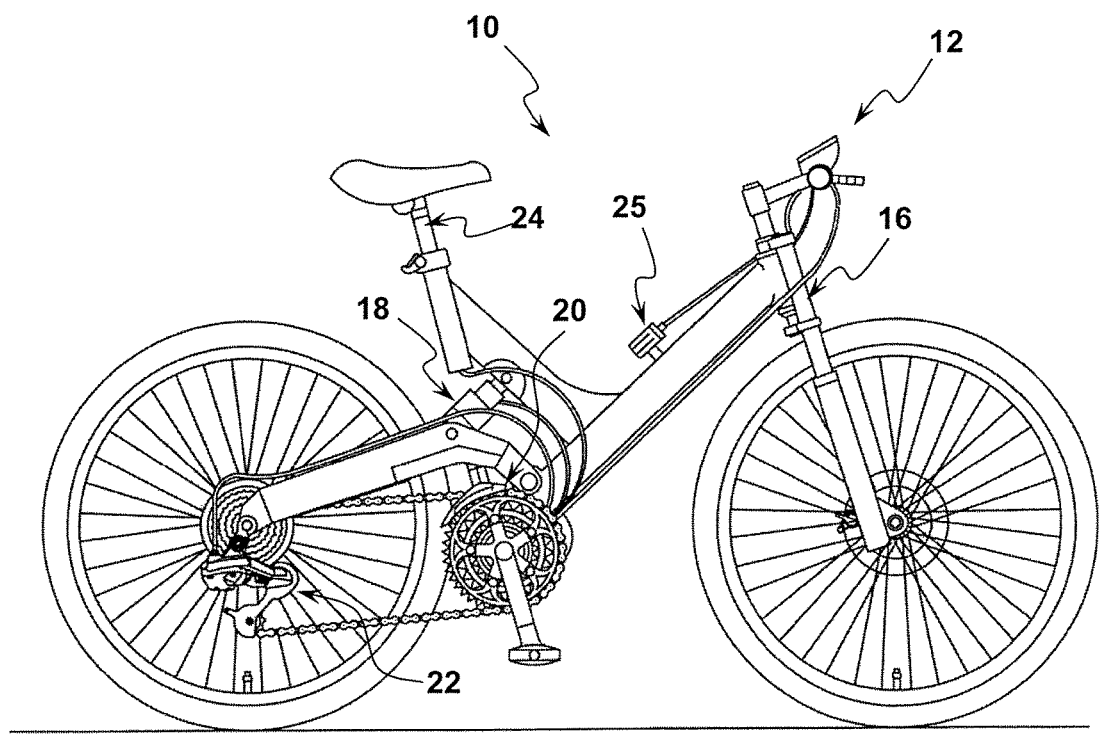
FIG. 1 is a side elevational view of a bicycle that is equipped with a bicycle component control apparatus in accordance with one embodiment.

Referring initially to FIG. 1, a bicycle 10 is illustrated that is equipped with a bicycle component control apparatus 12 for controlling the operations of various electrical bicycle components in accordance with one illustrated embodiment. In the illustrated embodiment, the bicycle component control apparatus 12 is provided with a controller 14 mounted on a handlebar 15, an electrically adjustable front suspension 16, an electrically adjustable rear suspension 18, an electrically operated front derailleur 20, an electrically operated rear derailleur 22 and an electrically operated seatpost 24. The front suspension 16, the rear suspension 18, the front derailleur 20, the rear derailleur 22 and the seatpost 24 constitute examples of electrical bicycle components that are at least partially controlled by the controller 14 based on an operation of one or more manually operated input members or devices as discussed below. Thus, the front suspension 16, the rear suspension 18, the front derailleur 20, the rear derailleur 22 and the seatpost 24 will be collectively referred to as the electrical bicycle components 16, 18, 20, 22 and 24 for the sake of convenience. However, the bicycle component control apparatus 12 is not limited to the electrical bicycle components 16, 18, 20, 22 and 24 described and illustrated herein. Rather, the bicycle component control apparatus 12 can have only one of the components 16, 18, 20, 22 and 24, or any combination of the electrical bicycle components 16, 18, 20, 22 and 24 as well as other electrical bicycle components (not shown) as needed and/or desired. In any event, in the illustrated embodiment, the controller 14 is configured to control an operation of each of the electrical bicycle components 16, 18, 20, 22 and 24 by selectively outputting a control parameter to the electrical bicycle components 16, 18, 20, 22 and 24 for selectively controlling an operating state of the electrical bicycle components 16, 18, 20, 22 and 24, as discussed below.

Figure 3:
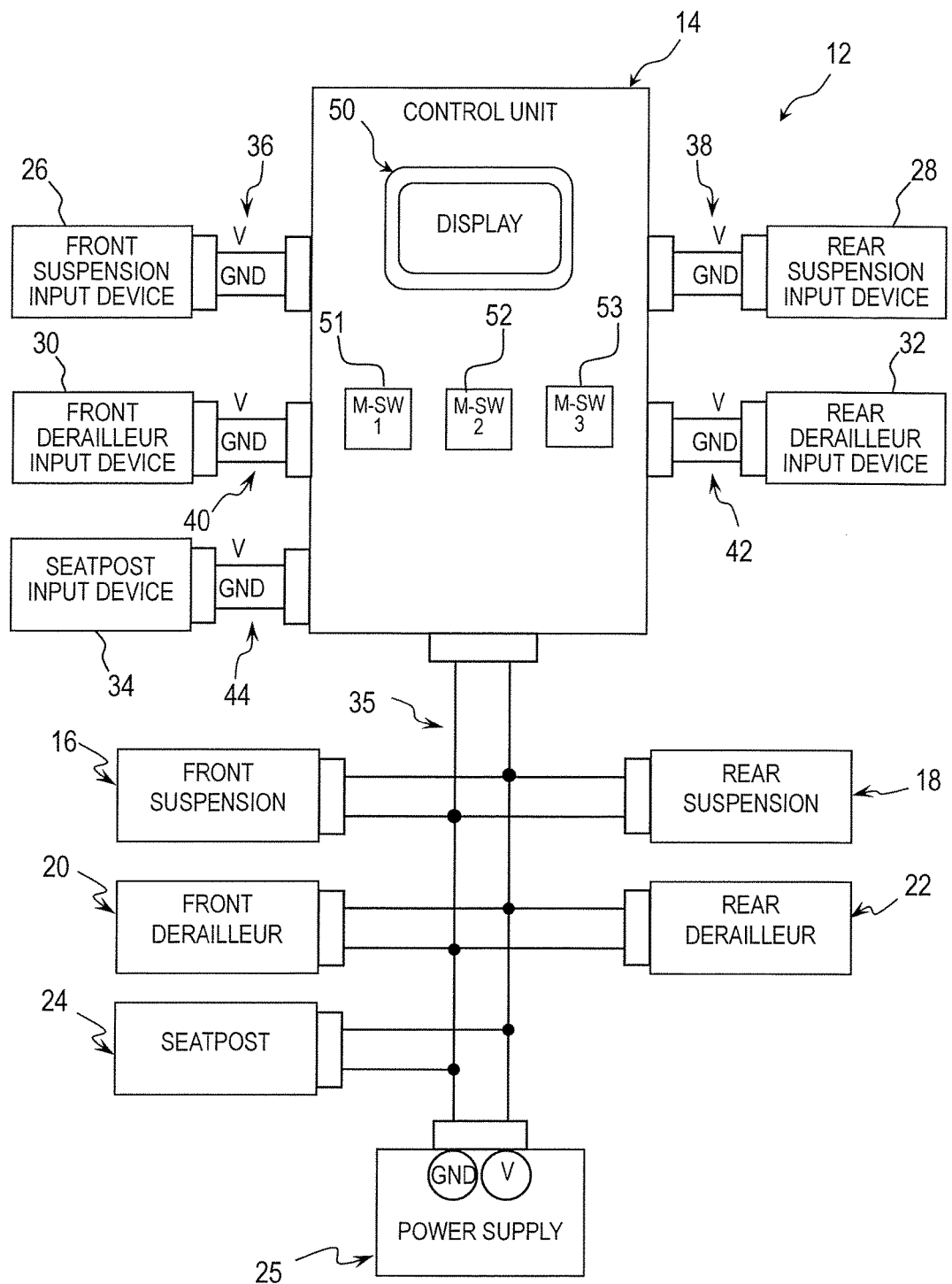
FIG. 3 is a schematic block diagram showing an entire configuration of the bicycle component control apparatus.

As seen in FIGS. 1 and 3, the bicycle component control apparatus 12 is also provided with a power supply 25 (e.g., a battery as shown) for supplying electrical power to the controller 14 and the electrical bicycle components 16, 18, 20, 22 and 24. In other words, the power supply 25 constitutes an electrical energy storage device or storage element that serves as a power source for the electrical components of the bicycle 10. The power supply 25 is not limited to a battery as the power supply. Rather, for example, a generator by itself or a generator in conjunction with a battery can be used for the power supply of the controller 14 and the electrical bicycle components 16, 18, 20, 22 and 24. The power supply 25 is a battery in the illustrated embodiment. The battery of the power supply 25 can be, for example, a nickel hydrogen battery or a lithium ion battery. For example, the power supply 25 preferably supplies a power supply voltage V of about V1 volts (DC) to the controller 14 and the electrical bicycle components 16, 18, 20, 22 and 24.

As explained below in more detail, the controller 14 is configured to selectively change various setting states of the electrical bicycle components 16, 18, 20, 22 and 24 in response to a manual input from a rider or an automatic input from a control program in the controller 14. In other words, the controller 14 is configured to selectively change at least one electrically adjustable suspension parameter of each of the electrical bicycle components 16, 18, 20, 22 and 24 either manually or automatically.

In certain situations, two or more of the electrical bicycle components 16, 18, 20, 22 and 24 are simultaneously operated while the power level of the power supply 25 is above a prescribed power level (a predetermined value) P1. However, as discussed below, when the power supply level of the power supply 25 becomes lower than the prescribed power level P1, the controller 14 will only allow the electrical bicycle components 16, 18, 20, 22 and 24 that normally operate in a simultaneous manner to be operated at different starting times. In this way, when the power supply level is below the prescribed power level P1, the bicycle component control apparatus 12 can still effectively operate the electrical bicycle components 16, 18, 20, 22 and 24 to obtain the desired end operating state with only a minimal delay. Also the controller 14 can be configured such that the prescribed power levels P1 is adjustably by either the user and/or based on environmental conditions (e.g., temperature, season, etc.).

Figure 2:
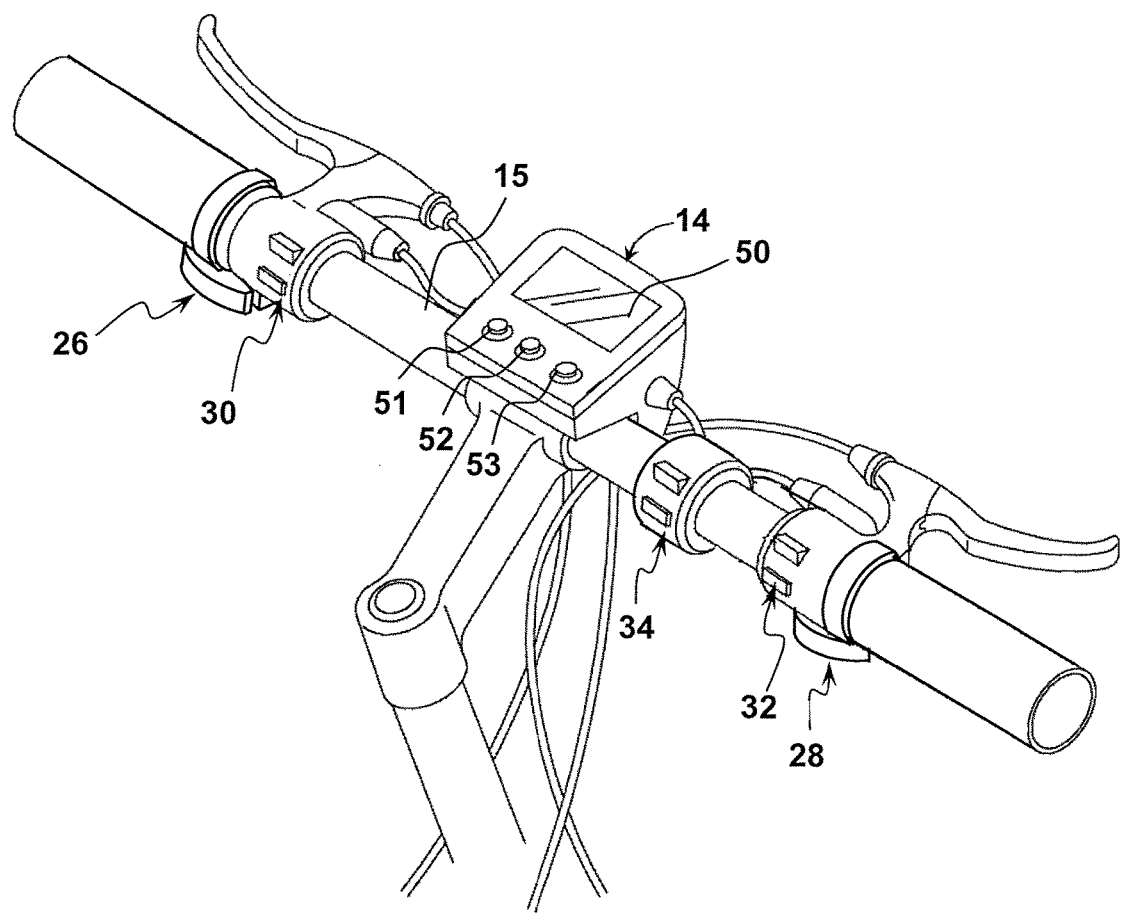
FIG. 2 is a perspective view of the handlebar area of the bicycle illustrated in FIG. 1, with a control unit and a plurality of operating or input devices mounted to a straight type handlebar.

Referring to FIGS. 2 and 3, the bicycle component control apparatus 12 is further provided with a front suspension input device 26, a rear suspension input device 28, a front derailleur input device 30, a rear derailleur input device 32 and a seatpost input device 34. In the first illustrated embodiment, the input devices 26, 28, 30, 32 and 34 are mounted on the handlebar 15 of the bicycle 10. The input devices 26, 28, 30, 32 and 34 constitute examples of manually operated input members or devices in the form of switches. While the switches or input devices 26 and 28 are illustrated as being used to operate the front and rear suspensions 16 and 18, it will be apparent from this disclosure that the input devices 26 and 28 can be configured to operate one of the other electrical bicycle components 20, 22 and 24. For example, the input device 26 can be used to operate the front derailleur 20, the rear derailleur 22, or the seatpost 24 as needed and/or desired.

The input devices 26, 28, 30, 32 and 34 are each operatively coupled to the controller 14. Each of the input devices 26, 28, 30, 32 and 34 selectively outputs an input signal to the controller 14 to change a setting of the electrical bicycle components 16, 18, 20, 22 and 24 in accordance with a control parameter that is outputted by the controller 14, as discussed below. The term "signal" as used herein is not limited to an electrical signal, but includes other types of signals such as a command.

The power supply 25 is electrically coupled to the controller 14 and the electrical bicycle components 16, 18, 20, 22 and 24 via an electric power line 35. The power line 35 is a two conductor wiring harness having a ground wire GND and a power or voltage wire V with branches to the electrical bicycle components 16, 18, 20, 22 and 24. The power line 35 preferably has detachable type plug-in connectors for detachably connecting the power line 35 to the controller 14 and the electrical bicycle components 16, 18, 20, 22 and 24 in a reattachable manner.

In the illustrated embodiment of FIG. 3, the front suspension input device 26 is detachably connected to the controller 14 by an electric power line 36. The rear suspension input device 28 is detachably connected to the controller 14 by an electric power line 38. The front derailleur input device 30 is detachably connected to the controller 14 by an electric power line 40. The rear derailleur input device 32 is detachably connected to the controller 14 by an electric power line 42. The seatpost input device 34 is detachably connected to the controller 14 by an electric power line 44. Each of the power lines 36, 38, 40, 42 and 44 has a plug-in connector at each end. Preferably, each of the power lines 36, 38, 40, 42 and 44 is a two conductor wire having a ground wire GND and a power or voltage wire V.

In this embodiment, the front suspension 16 includes a pair of combination air-oil operated shock absorbers with various adjustment elements. Preferably, the front suspension 16 includes an adjustment element for low speed and high speed compression damping, an adjustment element for stroke (piston travel or compression chamber volume), an adjustment element for air chamber pressure, for rebound damping, an adjustment element for lockout actuation, and an adjustment element for lockout force adjustment. Examples of such parameter adjustments may be found in current shock absorbers sold by suspension manufacturers. Since numerous types of conventional front suspensions can be utilized for the front suspension 16, the structure of the front suspension 16 will not be discussed and/or illustrated in detail. The front suspension 16 is manually operated by the front suspension input device 26 for controlling a state (e.g., lockout/non-lockout, travel-stroke length and/or damping rate) of the front suspension 16.

In this embodiment, the rear suspension 18 includes a combination air-oil operated shock absorber with a typical external spring (not shown in the drawings). The rear suspension 18 includes various adjustment elements. Preferably, the rear suspension 18 includes an adjustment element for spring preload, an external adjustment element for low speed and high speed compression damping, an adjustment element for air chamber pressure adjustment, an adjustment element for air chamber volume adjustment, an adjustment element for rebound damping, an adjustment element for lockout actuation, and an adjustment element for lockout force adjustment. Examples of such parameter adjustments may be found in current shock absorbers sold by suspension manufacturers. Since numerous types of conventional rear suspensions can be utilized for the rear suspension 18, the structure of the rear suspension 18 will not be discussed and/or illustrated in detail. The rear suspension 18 is manually operated by the rear suspension input device 28 for controlling a state (e.g., lockout/non-lockout, travel-stroke length and/or damping rate) of the rear suspension 18.

In this embodiment, the front derailleur 20 is an electrically operated device that laterally shifts a chain between front sprockets. Since numerous types of conventional front derailleurs can be utilized for the front derailleur 20, the structure of the front derailleur 20 will not be discussed and/or illustrated in detail. The front derailleur 20 is manually operated by the front derailleur input device 30 for controlling a state (e.g., shift position) of the front derailleur 20.

In this embodiment, the rear derailleur 22 is an electrically operated device that laterally shifts a chain between rear sprockets. Since numerous types of conventional rear derailleurs can be utilized for the rear derailleur 22, the structure of the rear derailleur 22 will not be discussed and/or illustrated in detail. The rear derailleur 22 is manually operated by the rear derailleur input device 32 for controlling a state (e.g., shift position) of the rear derailleur 22.

In this embodiment, the seatpost 24 is an electrically operated device that moves a bicycle seat in a parallel direction with respect to a center axis of the seat tube. Since numerous types of extendible seatpost can be utilized for the seatpost 24, the structure of the seatpost 24 will not be discussed and/or illustrated in detail. The seatpost 24 is manually operated by a seatpost input device 34 for controlling a state (e.g., height or length) of the seatpost 34.

Figure 4:
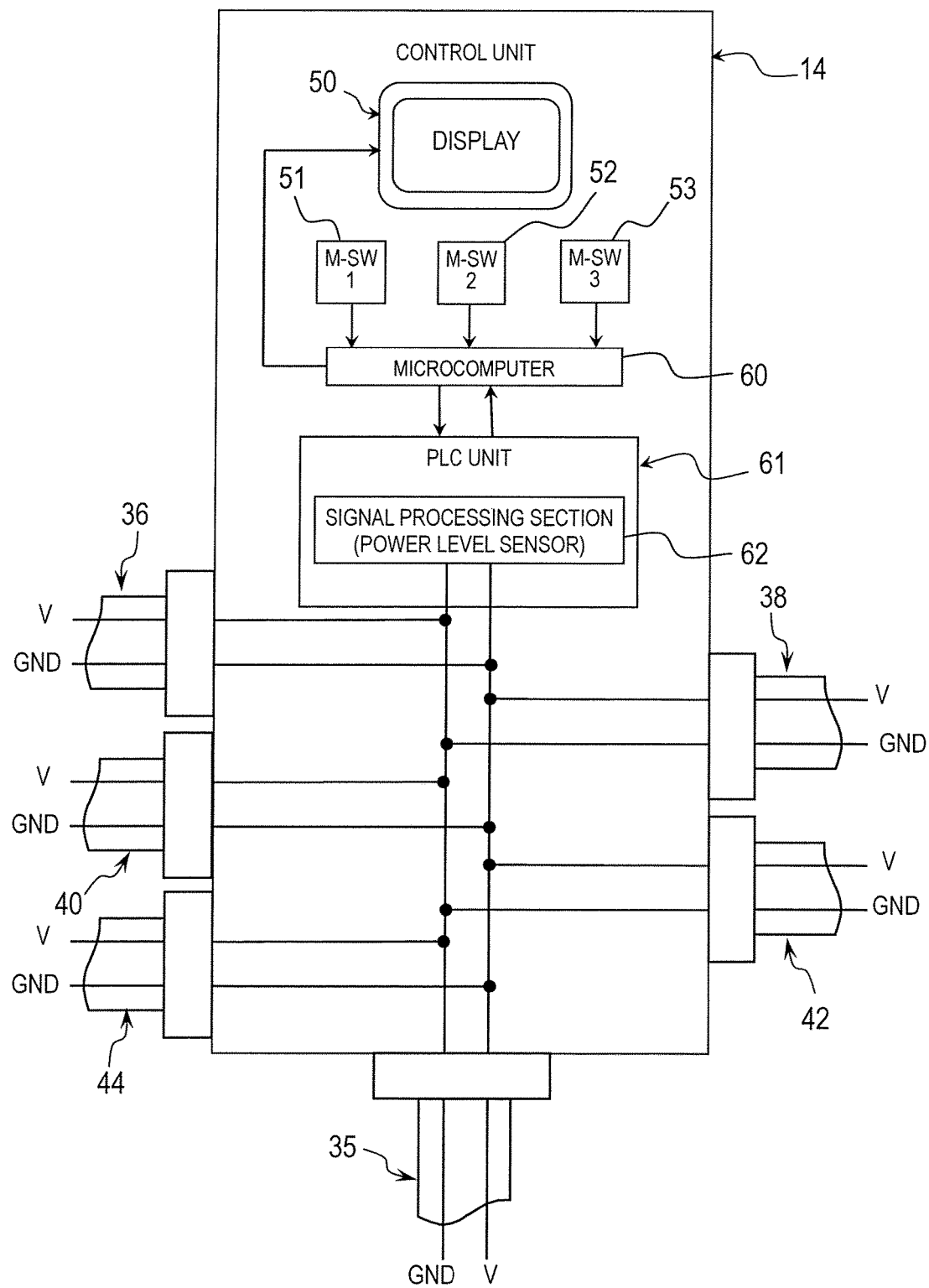
FIG. 4 is a schematic block diagram showing a basic configuration of the control unit of the bicycle component control apparatus.

Referring now to FIG. 4, a schematic block diagram is illustrated that shows a basic configuration of the bicycle component control apparatus 12. The controller 14 is provided with an integrated display 50 and three mode switches 51, 52 and 53 for controlling various modes of one or more of the input devices 26, 28, 30, 32 and 34. In other words, the mode switches 51, 52 and 53 are electrically connected to the controller 14 for controlling operation modes of controller 14 and operation modes of the input devices 26, 28, 30, 32 and 34. By using one or more of the mode switches 51, 52 and 53, the user can selectively change which of the electrically adjustable parameters are controlled by the input devices 26, 28, 30, 32 and 34. While the mode switches 51, 52 and 53 are illustrated as being integrated with the housing of the controller 14, one or more of the mode switches 51, 52 and 53 can be remotely located from the controller 14. Also the display 50 can be part of the controller 14, as illustrated, or can be a separate member that is electrically connected to the controller 14.

Using the mode switches 51, 52 and 53, the rider can change how the input devices 26, 28, 30, 32 and 34. For example, the input devices 26 and 28 can be switched between a lock out state adjustment mode, a travel-stroke length state adjustment mode and a damping rate state adjustment mode. Thus, the controller 14 is configured to selectively change various setting states of the electrical bicycle components 16, 18, 20, 22 and 24 in response to a manual input from a rider of the input devices 26, 28, 30, 32 and 34 or an automatic input from a control program in) the controller 14. In other words, the controller 14 is configured to selectively change at least one electrically adjustable parameter of each of the electrical bicycle components 16, 18, 20, 22 and 24 either manually or automatically. Also as explained below, the controller 14 can be set, either manually or automatically, so that operation of one of the electrical bicycle components 16, 18, 20, 22 and 24 will result in two of the electrical bicycle components starting simultaneously. Moreover, in the case of simultaneous operation of the electrical bicycle components, the sequence of the start timings for moving the components are preferably preset in advance as default settings and stored in the memory of the controller 14. For example, if the front and rear suspensions are moved, the controller 14 will set the start timings of the front and rear suspensions such that the rear suspension initially starts to move before the front suspension starts to move. However, it is also preferable to permit the user to override the preset default settings, such that the user can change the sequence of the start timings.

In certain modes, the mode switches 51, 52 and 53 can be used to set the controller 14 such that the controller 14 operates two or more electrical bicycle components 16, 18, 20, 22 and 24 in a simultaneous manner. This simultaneous operation of two or more electrical bicycle components 16, 18, 20, 22 and 24 can be done automatically by the controller 14 in response to various bicycle traveling conditions that are detected, or manually in response to operation of one of the input devices 26, 28, 30, 32 and 34. For example, the bicycle can be equipped with an accelerometer for determining the inclination of the bicycle 10, a speed sensor that measures the rotation of the front wheel for determining the velocity of the bicycle 10 and/or a torque sensor that measures the torque applied to the crank arm for determining the pedaling force. Using the data from these sensors, the controller 14 automatically adjusts the operating states (e.g., setting lockout/non-lockout states, travel-stroke length states and/or damping rate states) of the front and rear suspensions 16 and 18 simultaneously and/or automatically adjusts the operating states (e.g., setting gear positions) of the front and rear derailleurs 20 and 22 simultaneously. Moreover, the controller 14 automatically adjusts the seatpost 24 simultaneously with the front and rear suspensions 16 and 18 and/or simultaneously with the front and rear derailleurs 20 and 22. Preferably, the controller 14 is configured such that the rider can manually set which of the electrical bicycle components 16, 18, 20, 22 and 24 are operated simultaneously based on the bicycle traveling conditions that are detected. In other words, the controller 14 can be programmed by the rider, or at the factory, for any combination of the electrical bicycle components 16, 18, 20, 22 and 24 to be operated simultaneously based on the bicycle traveling conditions that are detected. Moreover, the controller 14 can be programmed by the rider, or at the factory, such that manual operation of a single one of the input devices 26, 28, 30, 32 and 34 results in simultaneous operation of any combination of the electrical bicycle components 16, 18, 20, 22 and 24.

Figure 11:
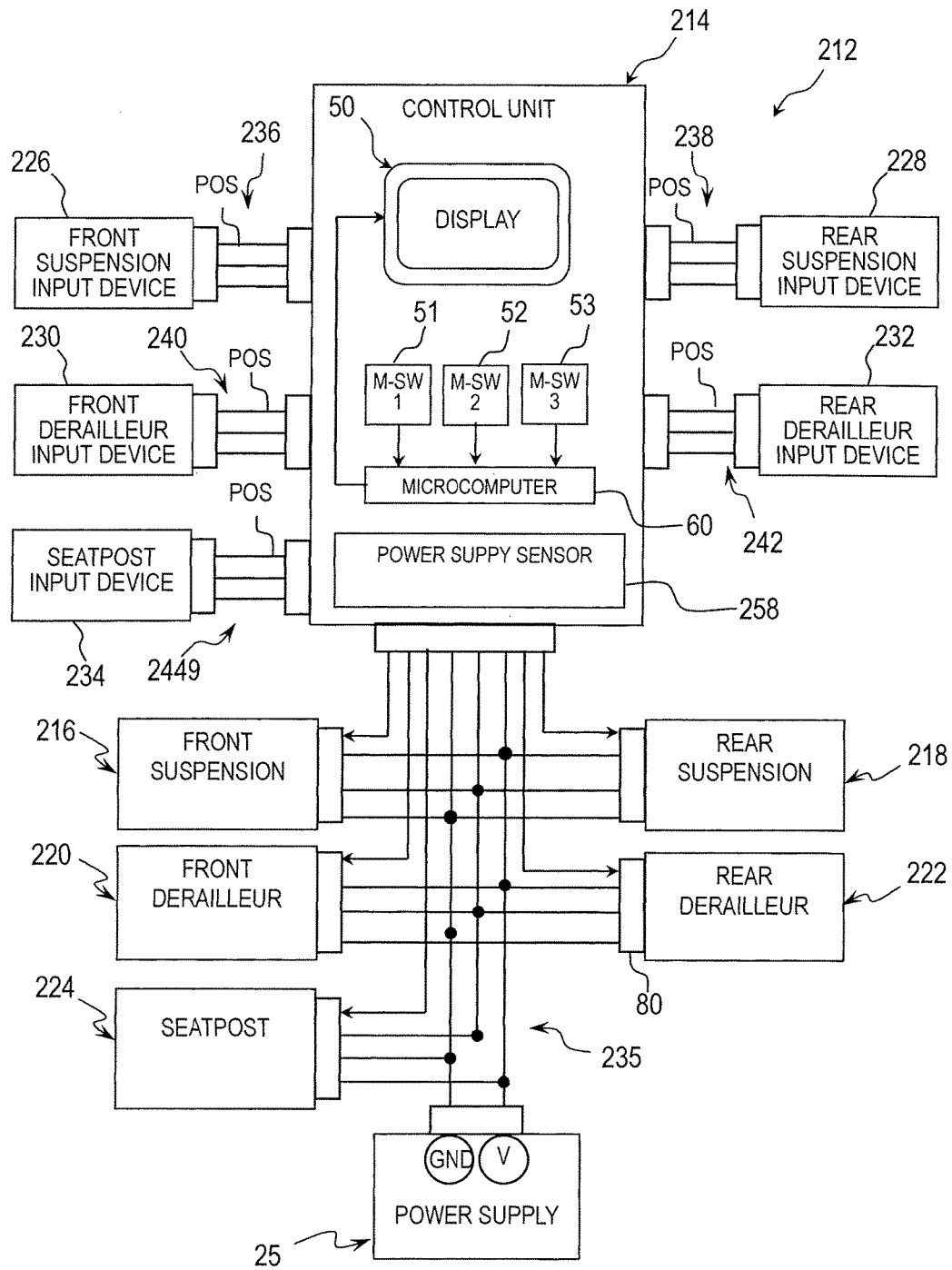
FIG. 11 is another alternative schematic block diagram showing an entire configuration of another alternative bicycle component control apparatus.

Still referring to FIG. 4, the controller 14 is also provided with a main microcomputer 60 and a power line communication (PLC) unit 61 that includes a signal processing section 62. The power line communication unit 61 is connected to the power supply 25 for receiving electric power. The power line communication unit 61 is part of a power line communication (PLC) system that is configured to execute two-way communications with each of the electrical bicycle components 16, 18, 20, 22 and 24, the power supply 25, and each of the input devices 26, 28, 30, 32 and 34 through the power lines 35, 36, 38, 40, 42 and 44. Thus, control signals or commands that control the electrical bicycle components 16, 18, 20, 22 and 24 are superimposed on the power source voltage flowing in the electric power lines 35, 36, 38, 40, 42 and 44 that interconnect the controller 14, the electrical bicycle components 16, 18, 20, 22 and 24, the power supply 25 and the input devices 26, 28, 30, 32 and 34. In this way, data can be transmitted between the controller 14 and the electrical bicycle components 16, 18, 20, 22 and 24 and the power supply 25 by the electric power line 35. Optionally, instead of using power line communications (PLC), in addition to a ground wire GND and a voltage wire V, separate signal wires can be provided for transmitting data as needed and/or desired as seen in FIG. 11.

In any event, in this first embodiment, the controller 14 outputs one or more predetermined control parameters to the electrical bicycle components 16, 18, 20, 22 and 24 via the power line 35 based on the operations of the input devices 26, 28, 30, 32 and 34. In the event of the power level of the power supply 25 falls below the prescribed power level P1, the controller 14 prohibit the electrical bicycle components 16, 18, 20, 22 and 24 from being simultaneously operated. Rather, upon determining the power level of the power supply 25 has fallen below the prescribed power level P1, the controller 14 will set different starting times for operating those electrical bicycle components 16, 18, 20, 22 and 24, which would otherwise be simultaneously operated.

The main microcomputer 60 includes control circuits with one or more CPUs, storage units, computation units and the like. The main microcomputer 60 also includes software that outputs the predetermined control parameters in accordance with adjustment signals outputted from the input devices 26, 28, 30, 32 and 34. In particular, using the signal processing section 62, the main microcomputer 60 outputs predetermined control parameters output based on the operation of the input devices 26, 28, 30, 32 and 34 to control the electrical bicycle components 16, 18, 20, 22 and 24 in accordance with adjustment signals outputted from the input devices 26, 28, 30, 32 and 34. The main microcomputer 60 forms part of a bicycle adjusting controller together with other microcomputers of the electrical bicycle components 16, 18, 20, 22 and 24 as explained below.

The signal processing section 62 constitutes a power level sensor that detects a power level of the power supply 25. The signal processing section 62 can be integrated into the main microcomputer 60 or a separate component as needed and/or desired. Moreover, a separate power level sensor can be used if needed and/or desire. The power level sensor can be any type of device that can determine or estimate the power level of the power supply 25.

Figure 5:
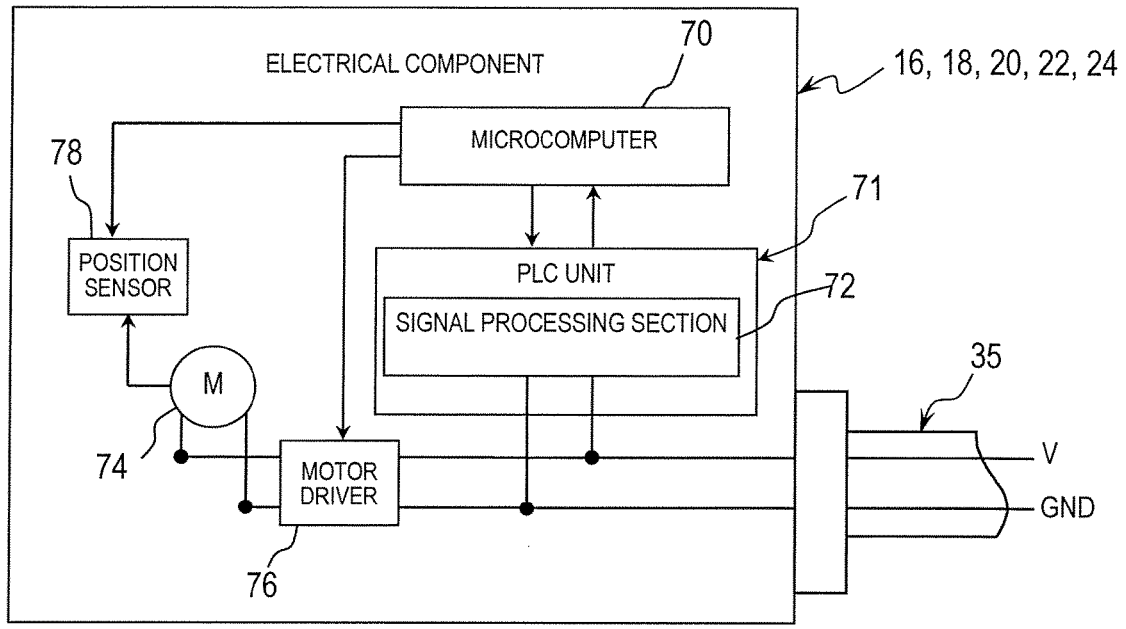
FIG. 5 is a schematic block diagram showing a basic configuration of each of the electrical components of the bicycle component control apparatus.

Turning now to FIG. 5, the basic configuration of the controlling part of each of the electrical bicycle components 16, 18, 20, 22 and 24 will now be discussed. The mechanical structures of the electrical bicycle components 16, 18, 20, 22 and 24 are well known in the bicycle field. For this reason, the mechanical structures of the electrical bicycle components 16, 18, 20, 22 and 24 are not illustrated and/or discussed in detail herein. Each of the electrical bicycle components 16, 18, 20, 22 and 24 is basically provided with a sub-microcomputer 70 and a power line communication (PLC) unit 71 that includes a signal processing section 72.

The power line communication unit 71 is connected to the power supply 25 for receiving electric power. The sub-microcomputer 70 includes control circuits with one or more CPUs, storage units, computation units and the like. The sub-microcomputer 70 also includes software that outputs predetermined control parameters in accordance with adjustment signals outputted from the controller 14. In particular, using the signal processing section 72, the sub-microcomputer 70 also operates the corresponding one of the electrical bicycle components 16, 18, 20, 22 and 24 in accordance with adjustment signals outputted from the corresponding one of the input devices 26, 28, 30, 32 and 34. The sub-microcomputers 70 together with the main microcomputer 60 form the bicycle adjusting controller. It will be understood from this disclosure that the main microcomputer 60 can be eliminated such that the input devices 26, 28, 30, 32 and 34 directly communicate with the electrical bicycle components 16, 18, 20, 22 and 24 as needed and/or desired. If the main microcomputer 60 is eliminated, the signal processing section 72 for each electrical bicycle component constitutes a power supply sensor that detects a power level of the power supply. The signal processing section 72 can be integrated into the sub-microcomputer 70 or a separate component as needed and/or desired.

Still referring to FIG. 5, each of the electrical bicycle components 16, 18, 20, 22 and 24 is also provided with an actuator 74, an actuator driver 76 and a position sensor 78. The actuator 74 is a reversible motor that is configured and arranged to drive a valve, a like or the like of the electrical bicycle component. While the actuator 74 is illustrated as a motor in the illustrated embodiments, the actuator 74 can be other types of devices such as a solenoid. The actuator 74 adjust the position of a part to set a state of the electrical bicycle component, e.g., a lockout state, a damping rate state, a travel-stroke length state, a gear position, a seatpost height position state etc. The actuator driver 76 drives the actuator 74 in response to control signals from the sub-microcomputer 70. The actuator driver 76 includes motor drivers and deceleration units for driving and decelerating the rotation of the actuator 74. The position sensor 78 detects the position of the actuator 74 or other part of the electrical bicycle component that is indicative its current setting position or state. The sub-microcomputer 70 is configured and arranged to control the actuator driver 76 in response to an adjustment signal from the input device for that electrical bicycle component via the controller 14. The sub-microcomputer 70 includes software that controls the actuator 74 in accordance with adjustment signals outputted from the input device for that electrical bicycle component via the controller 14.

Figure 6:
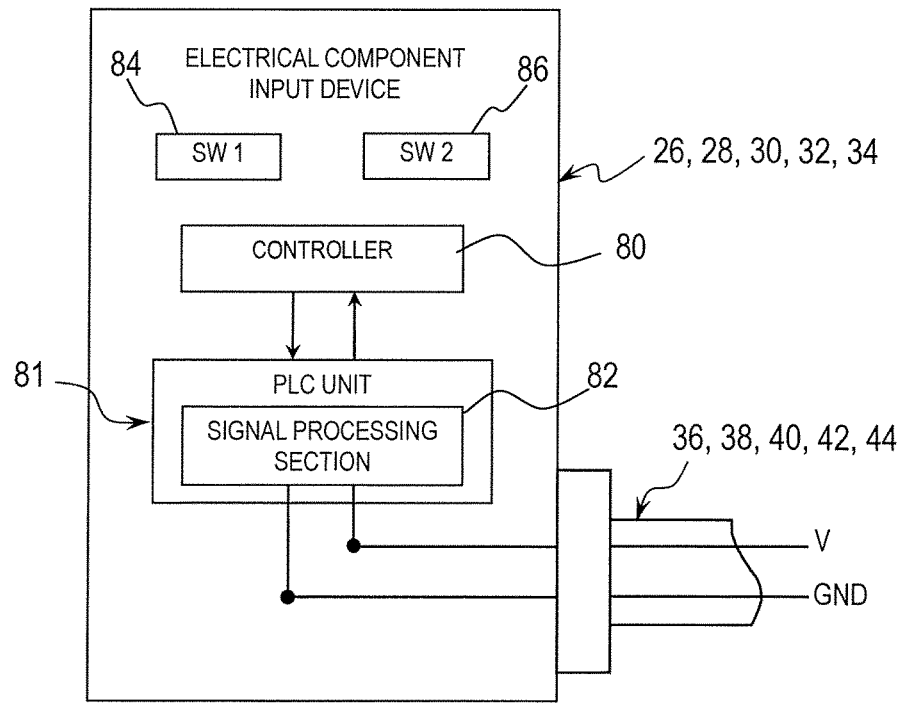
FIG. 6 is a schematic block diagram showing a basic configuration of each of the input devices of the bicycle component control apparatus.

Turning now to FIG. 6, the basic configuration of the controlling part of each of the input devices 26, 28, 30, 32 and 34 will now be discussed. The mechanical structures of the input devices 26, 28, 30, 32 and 34 are well known in the bicycle field. For this reason, the mechanical structures of the input devices 26, 28, 30, 32 and 34 are not illustrated and/or discussed in detail herein. Each of the input devices 26, 28, 30, 32 and 34 is basically provided with a controller 80, a power line communication (PLC) unit 81 that includes a signal processing section 82. Each of the input devices 26, 28, 30, 32 and 34 is also provided with a pair of switches 84 and 86. The power line communication unit 81 is connected to the power supply 25 for receiving electric power. The signal processing section 82 can be integrated into the controller 80 or a separate component as needed and/or desired. The switches 84 and 86 can be any type of switches. Moreover, while each of the input devices 26, 28, 30, 32 and 34 is illustrated as including two switches, it will be apparent that more or less switches can be provided as needed and/or desired. Also, the switch 84 can be configured using the mode switches 51, 52 and 53 such that the switch 84 can simultaneously operate two or more of the electrical bicycle components 16, 18, 20, 22 and 24 with a single input signal as needed and/or desired. Likewise, the switch 86 can be configured using the mode switches 51, 52 and 53 such that the switch 86 can simultaneously operate two or more of the electrical bicycle components 16, 18, 20, 22 and 24 with a single input signal as needed and/or desired.

In this first illustrated embodiment of FIGS. 3 to 6, the bicycle adjusting controller of the bicycle component control apparatus 12 is made of a plurality of microcomputers with a power line communication (PLC) system interconnecting the electrical bicycle components and the input devices. It will be apparent from this disclosure that other configurations can be used for interconnecting the electrical bicycle components and the input devices. For example, the controller 14 could be eliminated and/or wireless communications can be used as explained below.

Figure 7:
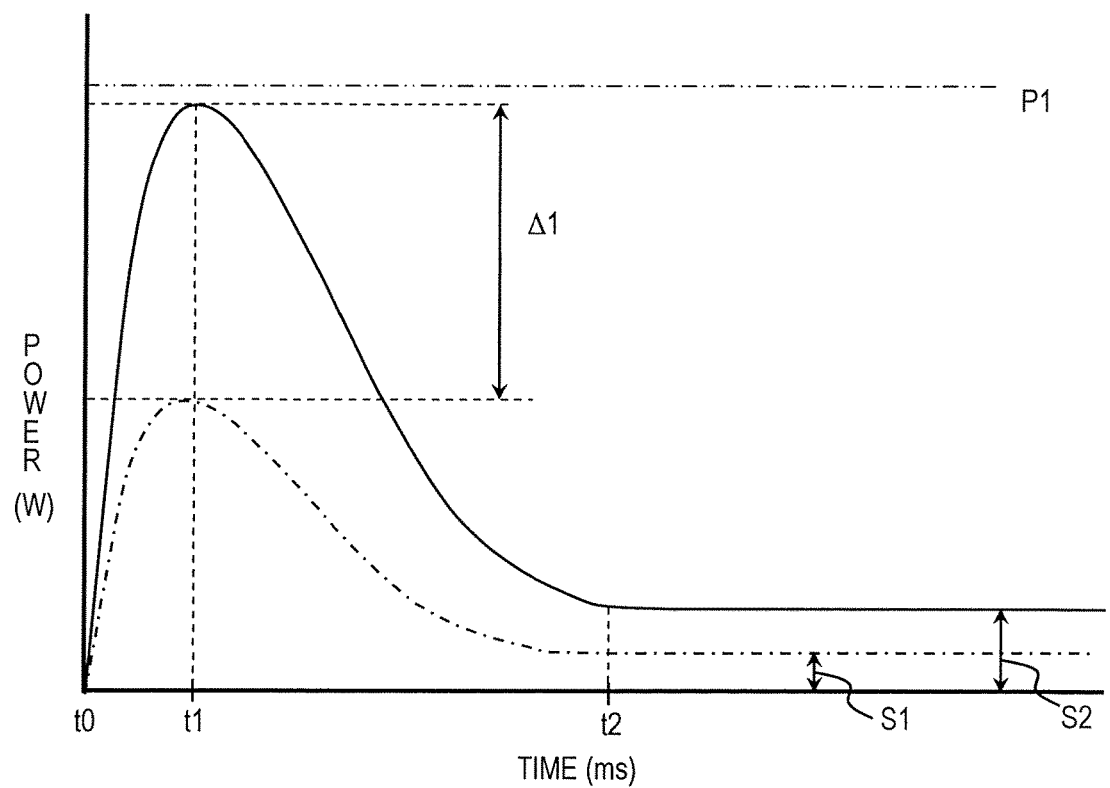
FIG. 7 is a graph illustrating the power fluctuation that occurs in the power line when simultaneously starting two electric actuators (e.g., electric motors) in comparison to starting a single actuator (e.g., electric motor)
Figure 8:
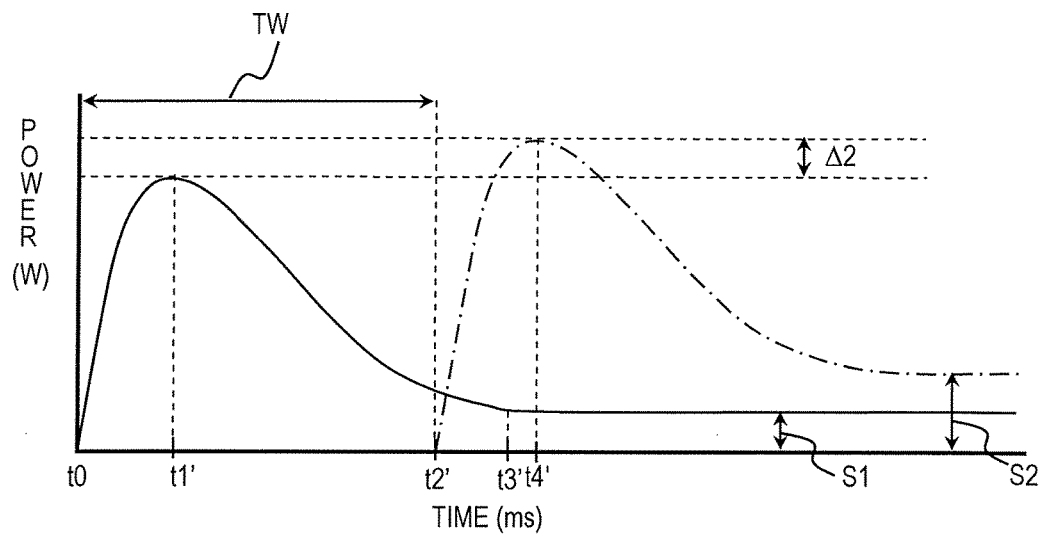
FIG. 8 is a graph illustrating the power fluctuation that occurs in the power line when sequentially starting two actuators (e.g., electric motors) with a partial overlap in the operation of the actuators (e.g., electric motors)
Figure 9:
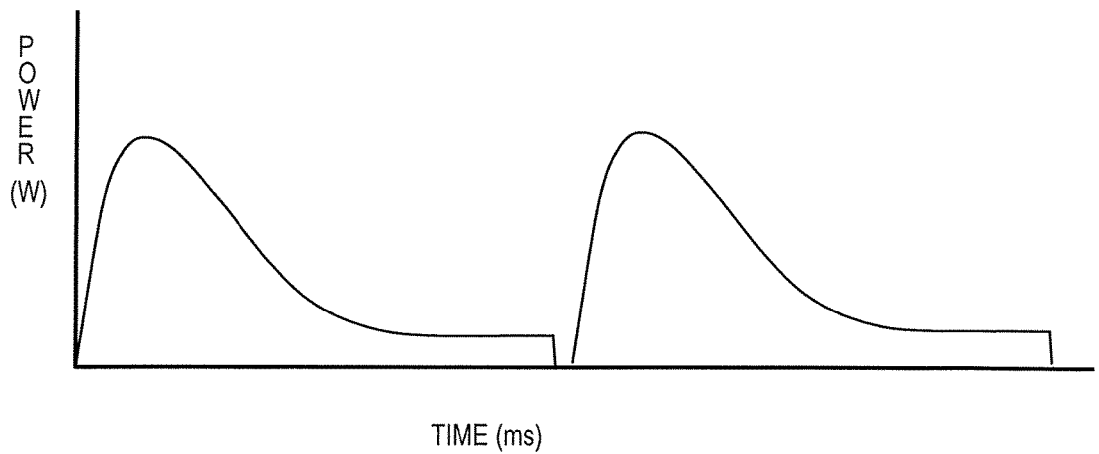
FIG. 9 is a graph illustrating the power fluctuation that occurs in the power line when sequentially starting two actuators (e.g., electric motors) with no overlap in the operation of the actuators (e.g., electric motors)

Referring now to FIGS. 7, 8 and 9, the effect of changing the starting times for operating the electrical bicycle components 16, 18, 20, 22 and 24 will now be discussed in more detail. FIG. 7 is a graph illustrating the power fluctuation that occurs in the power line 35 when simultaneously starting two actuators 74 (e.g., electric motors) in comparison to starting only one of the actuators 74 (e.g., electric motors) at a time. FIGS. 8 and 9 are a graph illustrating the power fluctuation that occurs in the power line 35 when sequentially starting two of the actuators 74. As seen in FIG. 7, the solid line illustrates the power requirement for simultaneously operating two of the actuators 74 in which the two actuators 74 are assumed to be identical for the sake of simplicity. At time t0, power is simultaneously supplied to the actuators 74 of two of the electrical bicycle components 16, 18, 20, 22 and 24 based on the controller 14 receiving at least one signal from at least one of the input devices 26, 28, 30, 32 and 34. When initially starting two of the actuators 74 simultaneously, the power requirement rises rapidly until it peaks at time t1. Then, after a few milliseconds, the power requirement falls until time t2. After time t2, the power requirement levels out at a prescribed power level S2 until the actuators 74 has stopped. As also seen in FIG. 7, the dash-dotted line illustrates the power requirement for operating only one of the actuators 74. When operating only one of the actuators 74, the peak power (or the peak current) requirement is less than the peak power (or the peak current) requirement for operating two of the actuators 74 simultaneously (i.e., the peak power requirement is less by an amount Δ1). Moreover, the steady state power requirement S1 for operation of only one of the actuators 74 is less than the steady state power requirement S2 for simultaneous operation of two of the actuators 74. In the illustrated example of FIG. 7, the peak power requirement for operating one actuator is approximately half of the peak power requirement for operating simultaneously operating two actuators, since the actuators are assumed to be identical one motor for the sake of simplicity. As seen in FIG. 8, when the controller 14 operates the actuators 74 of two of the electrical bicycle components 16, 18, 20, 22 and 24 at different starting times, while the power level is below the prescribed power level P1, the peak power requirement only slightly increases (i.e., the peak power requirement increases by an amount Δ2) over the power requirement for operating only one actuator 74 due to the increase amount of power needed to operate the two actuators 74 in an overlapping manner. In other words, FIG. 8 illustrates a case in which the two actuators 74 were operated such that operation of one of the actuators 74 for one of the two electrical bicycle components were started before operation of the other of the two electrical bicycle components is completed. FIG. 9 illustrates a case in which the two actuators 74 were operated such that operation of one of the two electrical bicycle components is started after operation of the other of the two electrical bicycle components is completed while the power level is below the prescribed power level P1. The time from t0 to t2' is longer than a prescribed time TW. For example, the prescribed time TW is longer than 40 ms. The controller 14 can be configured such that the prescribed time TW is adjustably by the user.

Figure 10:
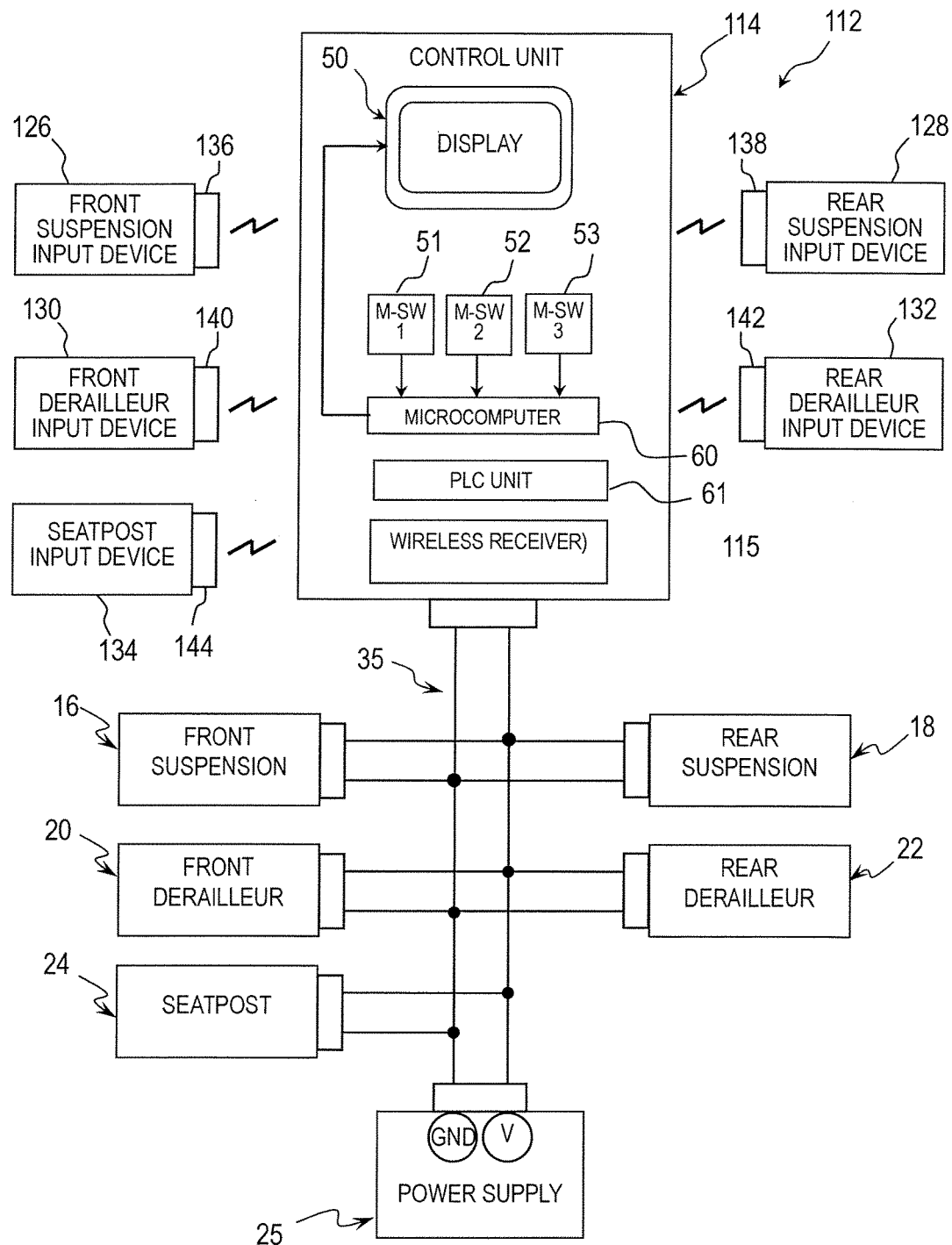
FIG. 10 is an alternative schematic block diagram showing an entire configuration of an alternative bicycle component control apparatus.

Referring now to FIG. 10, a schematic block diagram is illustrated that shows a basic configuration of a bicycle component control apparatus 112 that is provided with a control unit 114 for controlling the electrical bicycle components 16, 18, 20, 22 and 24 in response to manual inputs of input devices 126, 128, 130, 132 and 134, respectively. The parts of the control unit 114 that are identical to the parts of the first embodiment will be given the same reference numbers that are used in describing the first embodiment. Here, the control unit 114 is identical to the controller 14, except that the control unit 114 includes a wireless receiver 115 for wireless communicating with the input devices 126, 128, 130, 132 and 134 instead of via the power lines.

Also, the input devices 126, 128, 130, 132 and 134 are identical to the input devices 26, 28, 30, 32 and 34, except that the input devices 126, 128, 130, 132 and 134 includes transmitters 136, 138, 140, 142 and 144, respectively, instead of using power line communication unit. The transmitters 136, 138, 140, 142 and 144, wirelessly send command signals to the wireless receiver 115 of the control unit 114 in response to manual operation of the input devices 126, 128, 130, 132 and 134. Each of the input devices 126, 128, 130, 132 and 134 includes a battery for supply power to the transmitters 136, 138, 140, 142 and 144.

As seen in FIG. 10, the control unit 114 is electrically coupled to the electrical bicycle components 16, 18, 20, 22 and 24 by the power line 35 in the same manner as in the first embodiment. Of course, the control unit 114 and the electrical bicycle components 16, 18, 20, 22 and 24 can be configured to wireless communicate with each other. Alternatively, the control unit 114 can be eliminated, and the input devices 126, 128, 130, 132 and 134 and the electrical bicycle components 16, 18, 20, 22 and 24 can be configured with a wireless receiver to wireless communicate with each other. In any event, the simultaneous control of the electrical bicycle components 16, 18, 20, 22 and 24, based the power level of the power supply 25, is conducted in the same manner as the first embodiment.

Referring now to FIG. 11, a schematic block diagram is illustrated that shows a basic configuration of a bicycle component control apparatus 212 that is provided with a control unit 214 for controlling electrical bicycle components 216, 218, 220, 222 and 224 in response to manual inputs of input devices 226, 228, 230, 232 and 234, respectively. The electrical bicycle components 216, 218, 220, 222 and 224 are identical to the electrical bicycle components 16, 18, 20, 22 and 24, respectively, except that each of the electrical bicycle components 216, 218, 220, 222 and 224 just has a microcomputer.

The parts of the control unit 214 that are identical to the parts of the first embodiment will be given the same reference numbers that are used in describing the first embodiment. Here, the control unit 214 is identical to the controller 14, except that the control unit 214 includes dedicated signal wires POS and a power (voltage) supply sensor 258 instead of using the power lines to communicate for communicating with the input devices 226, 228, 230, 232 and 234 and the electrical bicycle components 216, 218, 220, 222 and 224. In other words, the control unit 214 is connected to the input devices 226, 228, 230, 232 and 234 by power lines 236, 238, 240, 242 and 244, respectively, which each includes at least one dedicated signal wire POS in addition to the ground line and the voltage line. The control unit 214 is connected to the electrical bicycle components 216, 218, 220, 222 and 224 by power line 235, which includes two signal wires for controlling the electrical bicycle components 216, 218, 220, 222 and 224 and in addition to the ground line and the voltage line that supply power from the power supply 25 to the control unit 214 and the electrical bicycle components 216, 218, 220, 222 and 224. In any event, the simultaneous control of the electrical bicycle components 216, 218, 220, 222 and 224, based the power level of the power supply 25, is conducted in the same manner as the first embodiment.

Figure 12:
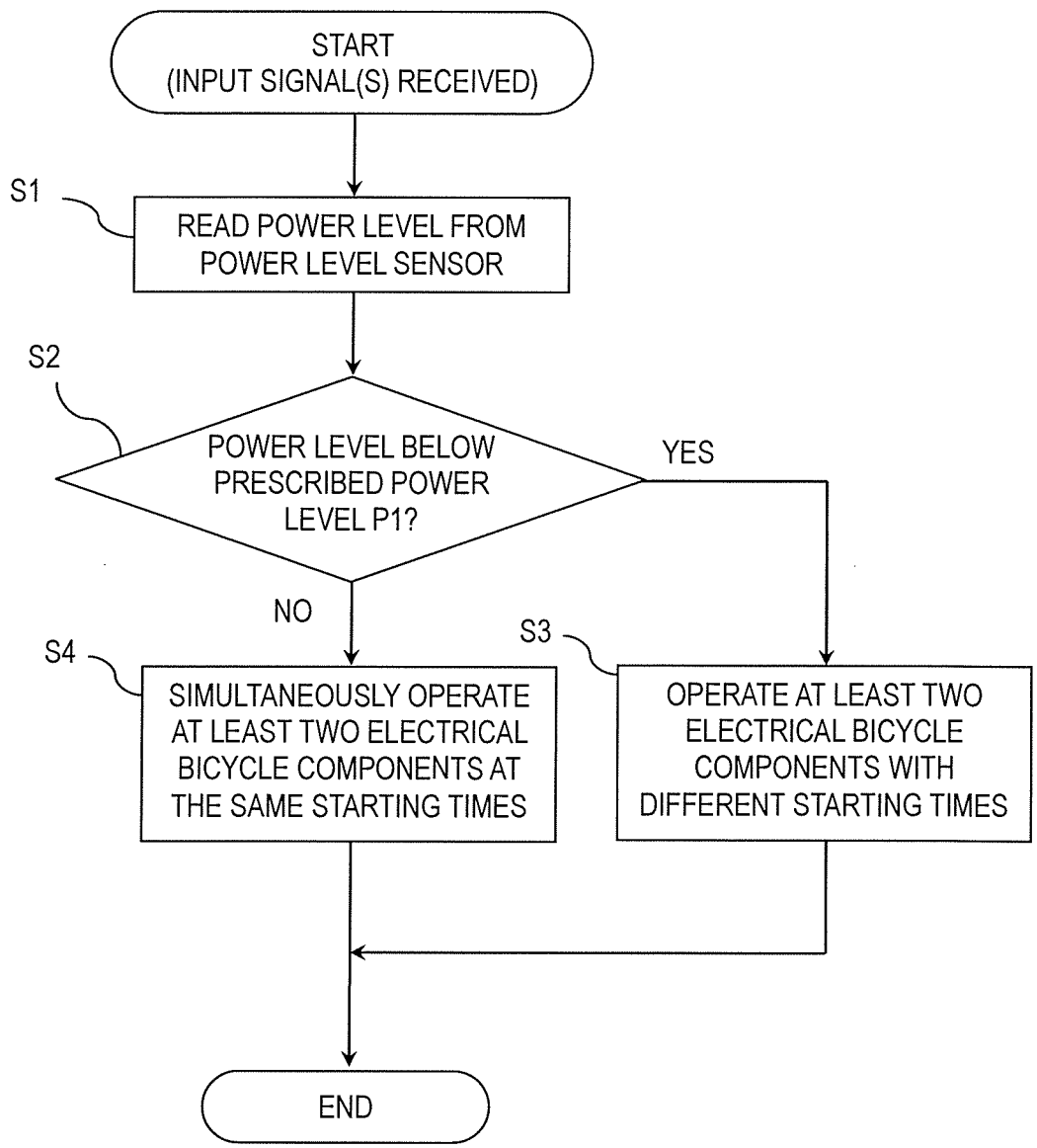
FIG. 12 is a flowchart showing a first control process executed by the controller of the bicycle component control apparatus.

Turning now to the flow chart of FIG. 12, in each of the above mentioned embodiments, the bicycle adjusting controller (i.e., the microcomputer 60 and/or the sub-microcomputers 70) conducts the process on when received signals from at least two input devices or a signal from one input device which controls at least two electronic devices.

In step S1, the power (voltage) level of the power supply 20 is read from the power supply sensor. In other words, the power supply sensor detects a power level of the power supply 25 being supplied from the power supply 25 to the electrical bicycle components. The power (voltage) level is then transmitted to one or both of the microcomputers 60 and 70. Then the process proceeds to step S2.

In step S2, the bicycle adjusting controller then determines if the power (voltage) level of the power supply 25 is below the first prescribed power level P1. If the power (voltage) level is below the first prescribed power level P1, then the process proceeds to step S3.

In step S3, the bicycle adjusting controller output predetermined control parameters for operating at different starting times of those electrical bicycle components 16, 18, 20, 22 and 24, which would otherwise be simultaneously operated while the power level is below the prescribed power level. In this way, sufficient power is available for completing the operation that could not be performed simultaneously.

However, in step S3, if the bicycle adjusting controller determines the power (voltage) level of the power supply 20 is not below the first prescribed power level P1, then the process proceeds to step S4. In step S4, the bicycle adjusting controller outputs commands or signals to simultaneously operate at least two of the electrical bicycle components 16, 18, 20, 22 and 24 at the same starting times. Then, the process returns to the beginning to start again at the next prescribed time interval.

Moreover, the bicycle suspension control apparatus is not limited to illustrated configurations. For example, the bicycle suspension control apparatus can be configured such that the power sensor 62 is disposed on the power supply 25. Also the bicycle suspension control apparatus can be configured such that a microcomputer (not shown) is provided in the power supply 25 with the microcomputer (not shown) of the power supply 25 forming a part of the bicycle adjusting controller. In such a case, the bicycle suspension control apparatus can be further configured such that the microcomputer 60 and at least of the microcomputer 70 and/or the microcomputer (not shown) of the power supply 20 can be combined together.

Figure 13:
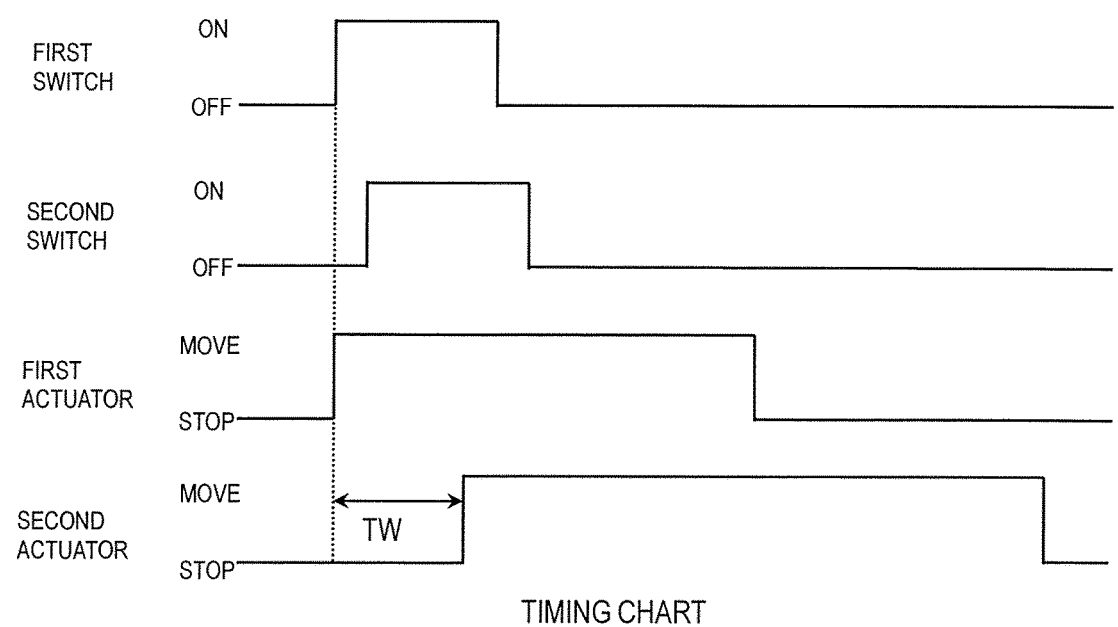
FIG. 13 is a timing chart showing activation of first and second actuators (e.g., electric motors) in response to input signals or commands due to operations of the first and second switches.

Referring now to FIG. 13, a timing chart is illustrated that shows activation of first and second actuators (e.g., electric motors) in response to input signals or commands due to operations of the first and second switches. If the operating timings of the first and second switches are simultaneously or slightly different (below a predetermined time), then first and second actuators (e.g., electric motors) are moved at different starting times. The bicycle adjusting controller moves the second actuator after the prescribed time TW from when the first actuator started to move. If the operating timings of the first and second switches are slightly different, the bicycle adjusting controller moves the second actuator after prescribed time TW from when the first motor started to move.

The bicycle adjusting controller waits to operate the second actuators after prescribed time TW from when the first actuators started to move. If several components are operated at the different starting times, then the current value become lower as compared to when the same components are operated at the same starting times. Thus, electric lines having a lower current rating can be used. In this case, the electric lines are lighter so that the electrical system of the bicycle becomes more lightweight than is if electric lines with a higher current rating were used.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control apparatus comprising:
   a power supply sensor that detects a power level of a power supply being supplied from the power supply to two electrical bicycle components; and
   a controller configured to operate the two electrical bicycle components in response to receiving at least one signal from at least one input member, the power level being detected responsive to the controller receiving the at least one signal from the input member, the power level being detected no more than one time for each input signal received by the controller,
   the controller being configured to operate the two electrical bicycle components at different starting times by setting different starting times when the power level is detected to be below a prescribed power level, the controller being configured to simultaneously operate the two electrical bicycle components when the power level is detected to be above the prescribed power level.

2. The bicycle component control apparatus according to claim 1, wherein
the controller is configured to receive a single signal from a single input member, and controls the two electrical bicycle components based on the single signal.

3. The bicycle component control apparatus according to claim 1, wherein
the controller is configured to receive first and second signals from first and second input members, and control the two electrical bicycle components based on the first and second signals, respectively.

4. The bicycle component control apparatus according to claim 1, wherein
the controller is configured to control the two electrical bicycle components such that operation of one of the two electrical bicycle components is started before operation of the other of the two electrical bicycle components is completed while the power level is below the prescribed power level.

5. The bicycle component control apparatus according to claim 1, wherein
the controller is configured to operate the two electrical bicycle components by supplying at least one electrically parameter.

6. The bicycle component control apparatus according to claim 1, wherein
each of the two electrical bicycle components includes at least an electrical actuator respectively.

7. The bicycle component control apparatus according to claim 6, wherein
the controller is configured to operate the electrical actuators.

8. The bicycle component control apparatus according to claim 1, wherein
the controller is configured to control the two electrical bicycle components such that operation of one of the two electrical bicycle components is completed before operation of the other of the two electrical bicycle components is started while the power level is below the prescribed power level.

9. The bicycle component control apparatus according to claim 1, wherein
the controller is configured to set states of front and rear bicycle suspensions.

10. The bicycle component control apparatus according to claim 1, wherein
the controller is configured to set states of front and rear derailleurs.

11. The bicycle component control apparatus according to claim 1, wherein
the controller is configured to set states of at least two of a bicycle derailleur, a bicycle seat post, a front suspension and a rear suspension.

12. The bicycle component control apparatus according to claim 1, wherein
the controller is configured to operate at least one additional electrical bicycle component in response to receiving the at least one signal from the at least one input member such that the controller operate at least one of the two electrical bicycle components and the at least one additional electrical bicycle component at different starting times while the power level is below the prescribed power level.

13. The bicycle component control apparatus according to claim 1, wherein
the electrical bicycle components are selected from the group consisting of a front suspension, a rear suspension, a front derailleur, a rear derailleur and a seatpost.

14. A bicycle component control apparatus comprising:
a power supply sensor that detects a power level of a power supply being supplied from the power supply to at least two electrical bicycle components; and
a controller configured to operate each of the electrical bicycle components in response to receiving at least one signal from at least one input member, the power level being detected responsive to the controller receiving the at least one signal from the input member, the power level being detected no more than one time for each input signal received by the controller,
the controller being configured to operate each of the electrical bicycle components at different starting times by setting different starting times when the power level is detected to be below a prescribed power level,
the controller being configured to simultaneously operate each of the electrical bicycle components when the power level is detected to be above the prescribed power level.

15. The bicycle component control apparatus according to claim 14, wherein
the electrical bicycle components are selected from the group consisting of a front suspension, a rear suspension, a front derailleur, a rear derailleur and a seatpost.

16. A bicycle component control apparatus comprising:
a first electrical bicycle component;
a second electrical bicycle component;
a power supply sensor that detects a power level of a power supply being supplied from the power supply to the first and second electrical bicycle components; and
a controller configured to operate the first and second electrical bicycle components in response to receiving at least one signal from at least one input member, the power level being detected responsive to the controller receiving the at least one signal from the input member, the power level being detected no more than one time for each input signal received by the controller,
the controller being configured to operate the first and second electrical bicycle components at different starting times by setting different starting times when the power level is detected to be below a prescribed power level,
the controller being configured to simultaneously operate the first and second electrical bicycle components when the power level is detected to be above the prescribed power level.

17. The bicycle component control apparatus according to claim 16, wherein
the electrical bicycle components are selected from the group consisting of a front suspension, a rear suspension, a front derailleur, a rear derailleur and a seatpost.

* * * * *